United States Patent
Sergeev et al.

(10) Patent No.: US 8,184,545 B2
(45) Date of Patent: May 22, 2012

(54) TECHNIQUE FOR COMBATING LOOPS IN COMMUNICATION NETWORK

(75) Inventors: Andrew Sergeev, Kfar Sava (IL); Igor Balter, Ashdod (IL); Igor Shifrin, Petach-Tikva (IL); Alexander Kugel, Netanya (IL)

(73) Assignee: ECI Telecom Ltd., Petach Tikva (IL)

( * ) Notice: Subject to any disclaimer, the term of this patent is extended or adjusted under 35 U.S.C. 154(b) by 358 days.

(21) Appl. No.: 12/559,787

(22) Filed: Sep. 15, 2009

(65) Prior Publication Data
US 2010/0080239 A1    Apr. 1, 2010

(30) Foreign Application Priority Data
Sep. 28, 2008    (IL) .......................... 194412

(51) Int. Cl.
*H04L 12/56*    (2006.01)
(52) U.S. Cl. ......... 370/249; 370/401; 370/404; 370/406
(58) Field of Classification Search .................. None
See application file for complete search history.

(56) References Cited

U.S. PATENT DOCUMENTS

| | | | |
|---|---|---|---|
| 7,515,530 B2 * | 4/2009 | Jain et al. ...................... | 370/222 |
| 2004/0218539 A1 | 11/2004 | Anqud et al. | |
| 2006/0133286 A1 * | 6/2006 | Elie-Dit-Cosaque et al. | 370/249 |
| 2007/0002899 A1 | 1/2007 | Raman et al. | |
| 2007/0086361 A1 | 4/2007 | Allan et al. | |
| 2008/0062947 A1 * | 3/2008 | Retana et al. ................. | 370/342 |
| 2009/0168671 A1 * | 7/2009 | Holness et al. ............... | 370/256 |
| 2009/0234969 A1 * | 9/2009 | Mohan et al. ................. | 709/242 |
| 2009/0268609 A1 * | 10/2009 | Koch et al. .................... | 370/222 |

FOREIGN PATENT DOCUMENTS
JP    2007235691 A    9/2007
* cited by examiner

*Primary Examiner* — Robert Scheibel
*Assistant Examiner* — Duc Duong
(74) *Attorney, Agent, or Firm* — Browdy and Neimark, PLLC

(57) ABSTRACT

Technology for combating loops in multi-domain networks, by assigning to network domains categories, at least such as "high/trusted" and "low/less trusted", and by making a decision about relearning Forwarding Information Base FIB of any edge node interconnecting different network domains, utilizing the assigned categories.

12 Claims, 3 Drawing Sheets

TECHNIQUE FOR COMBATING LOOPS IN COMMUNICATION NETWORK

FIELD OF THE INVENTION

The present invention relates to a technique for preventing/mitigating loops formation in network systems of Layer 3 and Layer 2, and particularly in large networks where forwarding of traffic is based on MAC addresses.

BACKGROUND OF THE INVENTION

The problem of loop detection and prevention in networks has been studied quite well in the prior art.

JP2007235691A2 describes a solution for detecting loops in a MAC bridge network. A test frame is transmitted from a testing apparatus to the MAC bridge network, and when the test frame is returned to the testing apparatus, a loop generating direction judgment apparatus is started, which judges whether the loop exists and in which direction. The described solution requires a preliminary stage of generating packets which create excessive traffic in the network.

US2004218539A discusses a technique for managing loops between network devices such as customer and carrier edge devices, which involves monitoring the MAC moves that occur at a device to detect the existence of a loop and initiating a loop protection action if the MAC moves indicate that a loop exists. The number of MAC moves that indicates the existence of a loop is user programmable and pre-established in the device configuration. The number of MAC moves can be expressed as a MAC move threshold, which is defined in terms of, for example, a MAC move rate or a number of MAC moves. Typically, the loop protection action that is initiated in response to a detected loop involves blocking the flow of the looping packets at the corresponding device.

The solution allows detecting loops which already exist. However, the number of such loops can be huge so that the damage of having these loops in the network is essential and sometimes critical, while treatment of each and every loop endlessly appearing in the network can be practically impossible.

Each of the above prior art solutions tries to solve its specific problem, and all of them do it in their different ways. However, there is a problem which is quite known to specialists in the field, namely—how to cope with loops in large network systems which comprise one or more so-called core (transport) networks and a plurality of customers' access networks.

US2007086361A describes a technique where a Provider Link State Bridging (PLSB) expands static configuration of Ethernet MAC forwarding tables by the control plane and utilizes direct manipulation of Ethernet forwarding by a link state routing system. Bridges exchange state information by a link state bridging protocol so that a synchronized configured view of the network is shared between nodes. Each node can calculate shortest path connective between peer bridging nodes and populate the appropriate forwarding tables. A reverse path forwarding check is performed on incoming packets to provide loop suppression. For example, a source check module processes incoming packets and performs a lookup in the FIB (MAC forwarding table) to determine if the received port coincides with the port identified in the FIB for the particular Source MAC. If the received port/Source MAC does not match the expected port/Source MAC, the packet is discarded.

The above solution seems to be applicable to large networks and could be good but, in practice, complex systems are not provided with a common control plane for loop protection which would cover the whole system, though specific networks of the system may locally use their separate loop preventing mechanisms (like RSTP, etc.). As a result, such systems are very sensitive to loops formed at edge nodes interconnecting different networks.

Some other prior art references propose solutions concerning security (levels of authorizing) in networks, which aspects have nothing in common with the problem of preventing loops.

For example, US2007002899A describes a system having a local area network, and software to automatically evaluate a network layer address, a lower layer address, a network port identifier, and/or a domain name of an equipment interface that is to be connected to the network. The software is to determine whether one of these matches an expected value for the network. The software is to provide a credential for each equipment interface that is authorized to connect to the network and that has been authenticated by the software. The credential contains a lower layer address, a network layer address, a domain name, and a network port identifier. Other embodiments are also described and claimed. For example, a network port locking process configures a network port, to allow use of the network resources by successfully mapped equipment interface MAC addresses only. This results in denying access to all other interfaces that are deemed to be violators. If a violation is encountered, a port may be configured to shutdown. Additionally, the MAC addresses of violators may be detected on the ports, and can be tracked through the use of violator credentials that are written to a database for subsequent usage.

The solution of US2007002899A requires mapping of each and every device/interface in the network as being authorized/non-authorized for connecting to a particular port. In other words, a central data base and specific mapping order per device are required for performing so-called admission control. The method is applicable for a limited network such as an enterprise network where such a mapping is possible and where shutting down of a specific port cannot affect other associated networks.

OBJECT AND SUMMARY OF THE INVENTION

The invention is specifically intended for complex or multi-domain networks, especially for such where a number of customer (access) domains are interconnected with and via a central (core) network. In case the central core network is non-informed/agnostic on customers' networks topologies and on loop protection mechanisms in these networks, the traffic arriving from the core domain to the customer domain can often be looped back to the core network. This usually happens due to either mis-configurations or back door connections in the customers' networks. Other misconnections are possible as well.

The known loop prevention techniques based on port disabling are not acceptable in the case of multi-domain networks since any port associated, say, with the core network is usually shared by many traffic flows of different customers; such a port cannot be disabled without seriously affecting the traffic in numerous domains.

It is therefore the object of the present invention to provide a technology which would allow overcoming the above-mentioned problems of complex multi-domain networks not provided with a common loop protection control system.

The object can be achieved by assigning categories to network domains of a multi-domain network (the categories being at least such as high/"trusted" and low/"non trusted"), and by making any decision about relearning Forwarding Information Base FIB of an edge node that interconnects different network domains, by utilizing the assigned categories.

Namely, when a packet is received at the node, a relevant entry already existing in the FIB (say, an entry for the same source address SA as of the received packet) might be relearned. We keep in mind that any incorrect relearn of FIB may create a loop. The Inventor proposes to allow relearn of a relevant entry in the FIB only if the relearn is initiated by a network domain not less "trusted" than the network domain which previously "created" the entry. Actually, it is a method for combating traffic loops in a multi-domain network comprising at least two network domains interconnected by one or more edge nodes, each node having a Forwarding Information Base FIB, the method comprising:

assigning to each network domain of the multi-domain network one category C selected from a list comprising at least two categories: a high/"trusted" and a low/"non-trusted" (and making such an assignment known to each edge node, say, by providing appropriate hardware and/or software update or configuring of the nodes and their FIBs);

analyzing a packet arriving to a particular edge node and deciding whether to relearn a relevant existing entry in the FIB of the particular edge node, by taking into account category $C_P$ of the network domain from which the packet has arrived to the particular node, in comparison with a category $C_{FIB}$ associated with said existing entry.

Generally, relearning of the relevant FIB entry is prevented if the category $C_P$ is lower than a category $C_{FIB}$ associated with said FIB entry. (It goes without saying that when the existing FIB entry was learned from some previous packet, a category of the network domain from which that previous packet arrived was also learned and registered in the FIB as $C_{FIB}$. When the edge nodes are configured to recognize categories of the network domains, FIB also registers the categories.)

It should be noted that categories of the network domains are non-unique, i.e. one or more domains in the multi-domain network may be assigned the same category.

In a more specific version, the method further comprises:
assigning said network domains to ports of said one or more edge nodes so that at least one particular edge node comprises at least two ports respectively assigned to network domains of two different categories for interconnecting network domains of two different categories;

assigning to each network domain its unique ID and making it known to each of said one or more edge nodes;

performing the analysis of a packet arriving to a port of said particular edge node by checking its source address SA, and determining $ID_P$ and category $C_P$ of a network domain from which the packet arrives, and by checking whether there is an entry concerning said source address SA in the Forwarding Information Base FIB of the particular edge node and, if yes, what are $ID_{FIB}$ and $C_{FIB}$ of a network domain associated with said SA in said entry, the method further comprises preventing relearn of the entry in the FIB at least in cases when the source address SA appears to be stored in the FIB in association with a network domain having a different ID and a category higher than that of the network domain from which the packet has arrived: ($ID_{FIB} \neq ID_P$) and ($C_{FIB} > C_P$).

Preferably, the method prevents relearning of the FIB entry also in case when ($ID_{FIB} \neq ID_P$) and ($C_{FIB} = C_P$).

Further preferably, the method comprises discarding the packet if relearn of the entry in the FIB is prevented.

It should be kept in mind that relearning of the entry in FIB would mean that, in future, all packets with that specific SA address should be handled/forwarded by the edge node as if the network domain and the port via which the discussed analyzed packet was received are correct. In all cases not specified in the above definition, the method does not prevent relearn of the FIB entry since there are no suspects for loops in the network. As will be explained later, the method either approves the existing entry and refreshes the aging timer for that entry, or allows relearning the entry, for example when the packet is received from a domain having the higher category than the domain category registered in the FIB for the same SA. Naturally, in a case when FIB just does not comprise an entry concerning the SA, the FIB will learn that new SA—i.e. will create a new FIB entry where the SA will be associated with the data about SA, $ID_P$ and $C_P$ received in the packet and with the port at which the packet has been received. Specific cases of the algorithm will be described in the detailed description, with reference to the attached figures.

The method may also comprise optional diagnostic steps allowing detection/display of possible reasons which could cause the situation which finally has resulted in the rejection to relearn the FIB or even in the packet discard; the method provides an option of judging whether it was a loop suspect or a simple misconnection leading to an incorrect configuration. These diagnostic steps may include analyzing whether the $C_{FIB} < C_P$ or $C_{FIB} = C_P$, whether the re-forwarding attempt tried to change the port or not, the diagnosis usually comprises counting and analyzing the number of re-forwarding attempts.

The feature of configuring any particular edge node of the multi-domain network to comprise at least two ports respectively assigned to network domains of different categories (for interconnecting network domains of different categories) characterizes a specific "border" feature of the edge node, where some ports belong to network domains of a higher category (say, to a core domain/domains; such ports may even be called core ports) and other ports belong to domains of a lower category (say, access domains; such ports may called access ports).

It should be kept in mind that one port of a node can never be connected to network domains of different categories. It should also be noted that in some cases (for example, when the edge node has a dual-homing configuration) one port can be connected to more than one network domains of the same category.

It should be emphasized that the network provider/administrator may deliberately assign the high or even the highest (absolute) category to any specific device operating via an access port (say, to a powerful server being absolutely trusted). In one case, the device turns to an additional high category domain, as well as the a-priori "access" port turns to a "core" port. In the case of an absolutely trusted server, that device turns to a highest category domain; its port will also have the highest category.

The above forms an example demonstrating that the multi-domain network may comprise nodes which interconnect network domains having the same category but different IDs. If they do not comprise ports of different categories they actually cannot be called edge nodes. However, it does not mean that such a node cannot be enabled to implement the proposed general method. Any node (edge node or non-edge node) in the multi-domain network may be equipped or not equipped with a suitable hardware/software means and thus be either enabled or non-enabled to implement the method. For example, the multi-domain network may comprise some remote edge nodes which are served by another administrative entity and thus cannot be equipped with the inventive means for combating loops. Even in that case, the "enabled" edge nodes of the multi-domain networks still will be able to prevent/mitigate some loops, for example those created in the core network or not combated by the "non-enabled" nodes.

In the most preferred version, the combined network is composed of network domains utilizing MAC addressing for forwarding packets (Layer 2 networks). However, the method can be applied to Layer 3 networks, such as IP networks where forwarding of packets is performed based on IP source address of the packets. The FIB (forwarding information base) is to be considered a general name of an internal data base of a network node; it may have different names in different nodes/networks.

In the most preferred and practical case, there are only two categories of network domains—trusted (high) and non-trusted (low). Usually, trusted domains are core/transport/central domains and non-trusted domains are access domains where misconnections leading to loops usually take place.

Preferably, the multi-domain network with MAC addressing is a Metro/regional Ethernet network administratively divided into domains and comprising: at least one core network (Metro) network domain and a number of access (regional) network domains. In such a specific configuration, the core network has the high category (it is the trusted network), and the access networks have the low category (they are non-trusted networks in comparison with the core network). It should further be noted that the core network can also be divided (administratively) into different domains having their unique IDs but the same high category. Some examples of such a division will be discussed with reference to FIG. 2.

It goes without saying that the mentioned at least one edge node should be provided with information at least about the assignments of the network domains related to that edge node, and configured accordingly. Actually, the edge nodes can be provided with that information intrinsically, for example, when performing the assignment at the hardware level (i.e., configuring the edge node) by an operator. However, the configuring of the edge nodes can be performed based on information obtained from a central configuring/assignment entity such as a network management system In other words, the network must ensure any configuring entity—central, local or both.

As has been mentioned above, the proposed method does not allow relearning a port (a port associated entry) in the FIB for a packet arriving from a domain of a lower category, but preferably prohibits relearning of the entry for a packet arriving from a domain with a different ID even if it has the same category with that for which the entry was earlier stored in the FIB. Owing to that, the method allows:

a) preventing loops affecting the central core domain;

b) preferably, preventing loops of traffic between different access domains (i.e., those having the same low category but different IDs)—by implementing a so-called principle of independence of local domains, which is usually recommended for access networks.

c) preferably, preventing loops inside the core network (i.e., those having the same high category but different IDs), if there are more than one high category domains.

According to a second aspect of the invention, there is further provided a multi-domain network comprising at least one edge node interconnecting domains of the network, the network being adapted to implement the above-described method at least at one of its edge nodes. Examples of the network will be presented in the detailed description.

As a third aspect of the invention, there is provided a network node (preferably, an edge node) being capable of performing operations of the above-described method for preventing loops in a multi-domain network.

Such a node serves for interconnecting different network domains in a multi-domain network, and comprises a Forwarding Information Base FIB and a control and processing unit CPU cooperating with the FIB;

the control and processing unit and the FIB being designed/configured to recognize, process and register assignment of network domains of the multi-domain network to categories (C) selected from a list comprising at least two categories: a high ("trusted") and a low ("non-trusted");

the control and processing unit (CPU) being further designed for analyzing a packet arriving to a particular edge node, and for deciding, by utilizing the assigned categories, whether to relearn an existing relevant entry in the FIB upon receiving said packet.

The CPU is preferably operative to compare a category $C_P$ of a network domain from which the packet is received, and a category $C_{FIB}$ associated with said relevant entry in the FIB, and to prevent relearning of said entry if the category $C_P$ is lower than the category $C_{FIB}$.

Preferably, the relevant entry in the FIB may exist if packets with the same source address (SA) were previously received at the node. In our invention, an existing entry should comprise indication $C_{FIB}$ about category of the network domain from which packets have previously been received.

In the most preferred practical embodiment, the control and processing unit is operative to prevent relearning of the relevant existing FIB entry if the category $C_P$ is lower than a category $C_{FIB}$ associated with said FIB entry.

According to a further preferred embodiment, the CPU and FIB being further designed (configured) to recognize, process and register assignment of unique identifiers ID to network domains of the multi-domain network;

the edge node being configurable to comprise at least two ports respectively assigned to network domains of different categories;

the control and processing unit being designed for the following operations for analyzing the packet arriving to a port of said edge node:

checking source address SA of the packet, determining $ID_P$ and the category $C_P$ of a network domain from which the packet arrives, checking whether there is said relevant entry concerning said source address SA in the Forwarding Information Base FIB of the node and, if yes, what are $ID_{FIB}$ and $C_{FIB}$ of a network domain associated with said SA in said entry, the control and processing unit being designed for preventing relearn of the entry in the FIB at least in case when the source address SA appears to be stored in the FIB in association with a network domain having ID different and having category higher than those of the network domain from which the packet has arrived: $(ID_{FIB} \neq ID_P)$, $(C_{FIB} > C_P)$.

Preferably, the edge node is configured to prevent relearning of the FIB entry also in case when $(ID_{FIB} \neq ID_P)$ and $(C_{FIB} = C_P)$. Preferably, the control and processing unit of the edge node is a hardware unit configurable by an operator to perform the functions outlined above.

However, as an alternative, there can be provided a software product comprising computer implementable instructions and data storable on a computer readable medium, adapted to be installed in a network node of the multi-domain network and, when being run in a computer (the control and processing unit of a network node), being capable of supporting performance of the described method. It should be kept in mind that the network node must not obligatory be the edge node of the multi-domain network.

There may be further provided an additional or an alternative modification of the software product, comprising computer implementable instructions and data storable on a computer readable medium adapted to be installed in a network management system that maintains intercommunication at least with the described edge nodes of the multi-domain network; said modified software product is capable, when being run in the NMS computer, of initiating and supporting performance of the described method via nodes of the multi-domain network.

The invention will be further disclosed in detail, as the description proceeds.

BRIEF DESCRIPTION OF THE DRAWINGS

The invention will be further explained with reference to the following non-limiting drawings in which.

DETAILED DESCRIPTION OF THE PREFERRED EMBODIMENTS

Figure 1:
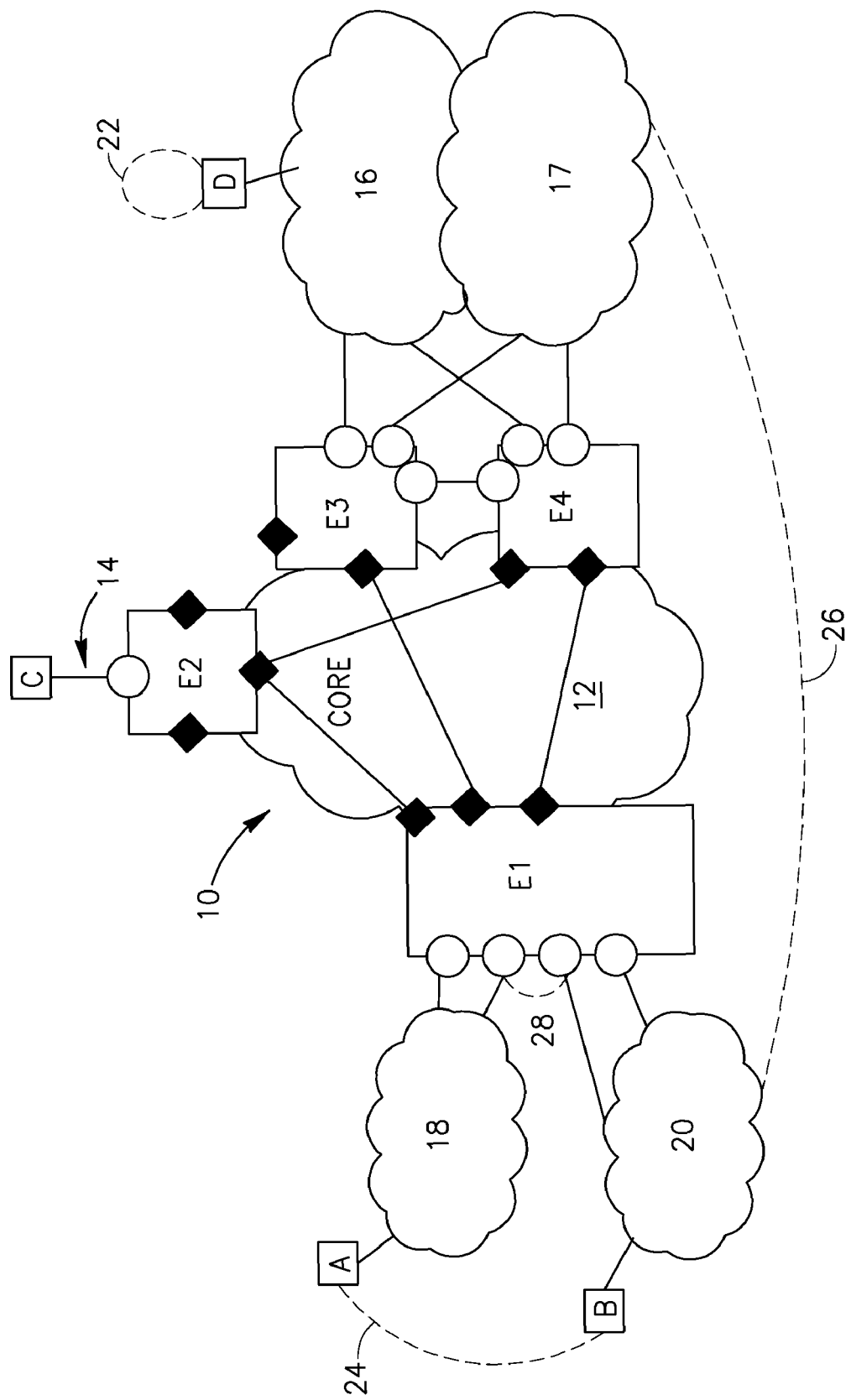
FIG. 1 is a schematic diagram of one exemplary configuration of a multi-domain network, where different domains are interconnected via edge nodes; the drawing illustrates some possible loops formed via peripheral network domains.

FIG. 1 schematically illustrates one simplified embodiment of a combined multi-domain network 10 comprising a core network domain 12 and a number of access (customers') network domains 14, 16, 17, 18, 19, 20. Let the reference numerals of the domains serve IDs of the network domains. In this example, the core domain 12 is interconnected with access domains via the following edge nodes: E1, E2 and a double (dual homing) node E3-E4. Each of these edge nodes at one of its sides is connected to the core domain 12 via "core ports" of the edge node, while at its other side each edge node is connected to one or more customers' domains, via its "access ports".

Let the core domain has a high category (it is considered a "trusted" domain) and the access domains have a low category (and are considered as "non-trusted" domains). In the drawing, the "access ports" of any of the edge nodes are shown as white circles placed on sides of the edge nodes; the "core ports" are shown as dark squares on sides of the edge ports facing the core network domain. It can be seen on the drawing that one port cannot serve (be assigned to) domains of different categories. For dual homing edge nodes (such as E3-E4) it is possible that more than one network domains of the same category happen to be legally assigned/connected to a specific port (say, the pair of ports interconnecting E3 and E4).

Each of the edge nodes has an internal control and processing unit comprising an internal memory block called a Forwarding Information Base FIB where routes of packets already known to the edge node are registered as entries where source address (SA) of a packet is associated with a domain from which the packet should arrive (by marking the domain ID and category) and a specific port of the edge node at which the packet is expected.

Some subscriber's equipment (computers, phones, faxes, servers, etc.) is shown at the access domains: a terminal A of domain 18, a terminal B at domain 20, a terminal D of domain 16 and a terminal C forming by itself the domain 14. In the example of FIG. 1, terminal C is a regular access terminal connected to the edge node E2 via a regular access port. Let us suppose that the core network has quite a large territory and that the access network domains adjoining opposite sides of the core network are geographically far away from one another—which is a very practical case.

The drawing also shows some examples of possible misconnections and loops (shown by dashed lines). They are: a misconnection 22 at the terminal D in the access network 16; a physical loop formed by some back door connection which was made by the customers between their terminals A and B; a loop formed, say, via a satellite/radio connection between the domain 20 and the domain 16. We keep in mind that according to the configuration of FIG. 1 and the principle of independence of local domains, any connection between access networks should be performed via their edge nodes, and not directly.

The above misconnections/loops can be combated/mitigated by means of the proposed technique, and it will be explained with reference to FIG. 3.

The multi-domain network 10 may be, for example, a Metro/Regional Ethernet network, and the access networks may constitute optical networks with optical network elements that provide Ethernet services for the customers.

The Metro/Regional Ethernet usually comprises at least one Provider Backbone (a Core domain such as 12) which interconnects Customers' sites/networks/VLANs (Virtual Local Area Networks). This Core is shared by all the Customers domains. Usually, the multi-domain Metro/Regional Ethernet network has a wide geographical deployment. The distances between customer sites/networks could be tens or even hundreds of kilometers. Due to such geographical dislocation, the situation when the same MAC address is learnt in association with different VLANs (customer domains) on different ports is not normal. (It may be accepted in small networks such as an enterprise local network. In small networks a router, for example, can be connected to two ports of an Ethernet switch so one and the same MAC address can arrive to the switch via two different routes, and it is considered normal.) In Metro/Regional Ethernet networks, the Customers networks could be any Ethernet networks (for example, deployed according to IEEE standard 802.1ad—Provider Bridges).

It should be noted that Customers domains might be other Metro Ethernet networks by themselves, and may have their own sub-access domains.

It should be emphasized that, in the Metro/Regional network, Customers domains may or may not launch their own loop prevention mechanisms (RSTP, MSTP, Fast rings etc.). The way of deployment and management of the Customers networks cannot be controlled by the Core network provider/control plane.

Figure 2:
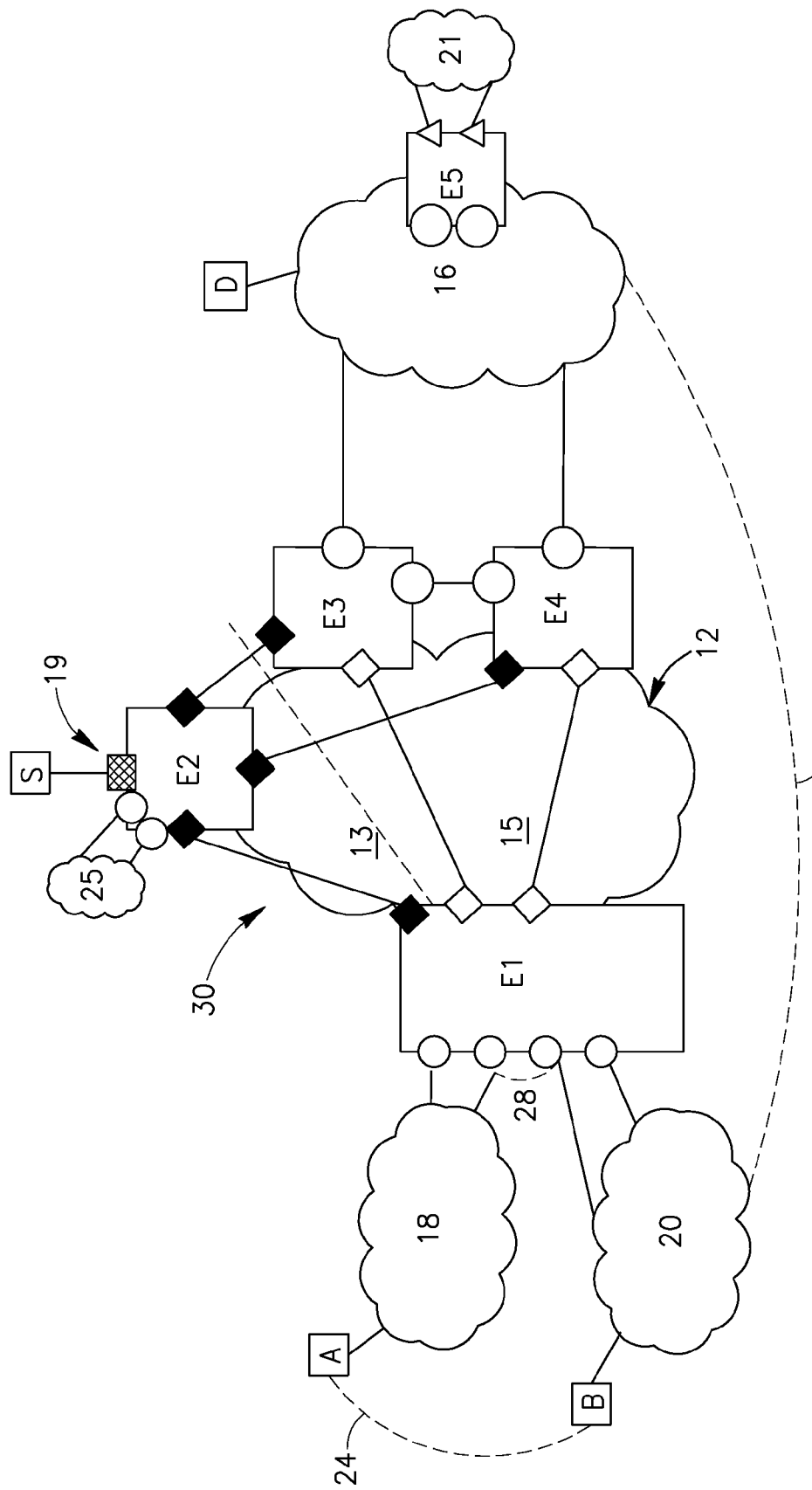
FIG. 2 is a schematic diagram of a slightly different configuration of the multi-domain network which is divided into domains in a different manner.

FIG. 2 illustrates a slightly different configuration 30 of the multi-domain network. The configuration 30 of FIG. 2 shows a network, where elements similar to those in FIG. 1 are marked with similar numbers while different elements are marked with different reference numerals.

As has been mentioned before, the multi-domain network under discussion may have a) one or more high category domains; b) one or more sub-access domains connected to an access domain so that the access domain serves as a core network to the sub-access domain(s).

For example, there may be cases when the network designer or operator deliberately gives a higher category ("trustiness") to a port which originally belongs to an access network. In FIG. 2, it is an E2 port connected to a trusted server S forming by itself a network domain 19. In the configuration illustrated in FIG. 2, the network domain 19, the server S and its associated port at E2 have acquired the high category ("trusted"). The mentioned port of S is therefore illustrated as a square, but it is hatched to show that it is connected to a different domain than the core domain. Alternatively, the operator may select to assign a so-called absolute (the highest) category of trustiness to the mentioned server S. In this case the hatched square port should be understood as a mark of the absolute category. If node E2 is additionally connected to an access domain 25, this node will have ports of domains of three different categories.

Another example of existence of more than one high category domains in one network is as follows. Each of the edge nodes (say, E1) being in communication with a number of remote edge nodes (say, with E2 and with E3-E4) may administratively divide the core network 12 into separate domains (marked 13, 15), each associated with its corresponding edge node. In this case, the administrative partitioning of the core network will be performed at each node for itself, for performing local analysis at the node according to the inventive method. To illustrate the last example, FIG. 2 shows that the core network 12 is administratively divided, by the edge node E1, into two core domains 13 and 15; the border is schematically shown by a dashed line. Since the core domains 13 and 15 have different IDs, but the same high category, the core ports of the edge node E1 have the square shape. However, the core ports of domain 13 are marked as dark squares, while the core ports of domain 15 are shown as white squares.

It should be noted that if all edge nodes in the multi-domain network are capable of implementing the proposed method (algorithm), no partitioning of the core domain into separate core sub-domains is necessary since each edge node is expected to prevent appearance of loops at its surrounding. However, if it is not the case, and some of remote edge nodes are not adapted to implement the proposed method, partitioning of the core network into separate sub-domains is desired, because it will allow the "enabled" edge nodes to prevent loops between sub-domains of the "non-enabled" edge nodes.

In FIG. 2, the access network domain 16 (of the low category) intercommunicates with a sub-access network domain 21 (having the lowest category called extra low). The intercommunication is performed via an edge node E5 which has access ports (marked as white circles) connecting it to domain 16 and sub-access ports (marked with white triangles) associating the edge port E5 with the extra low category network domain 21. FIG. 2 thus illustrates one example of a multi-domain network comprising domains assigned to more than two categories. Each edge node in such a network interconnects domains of at least two different categories.

Figure 3:
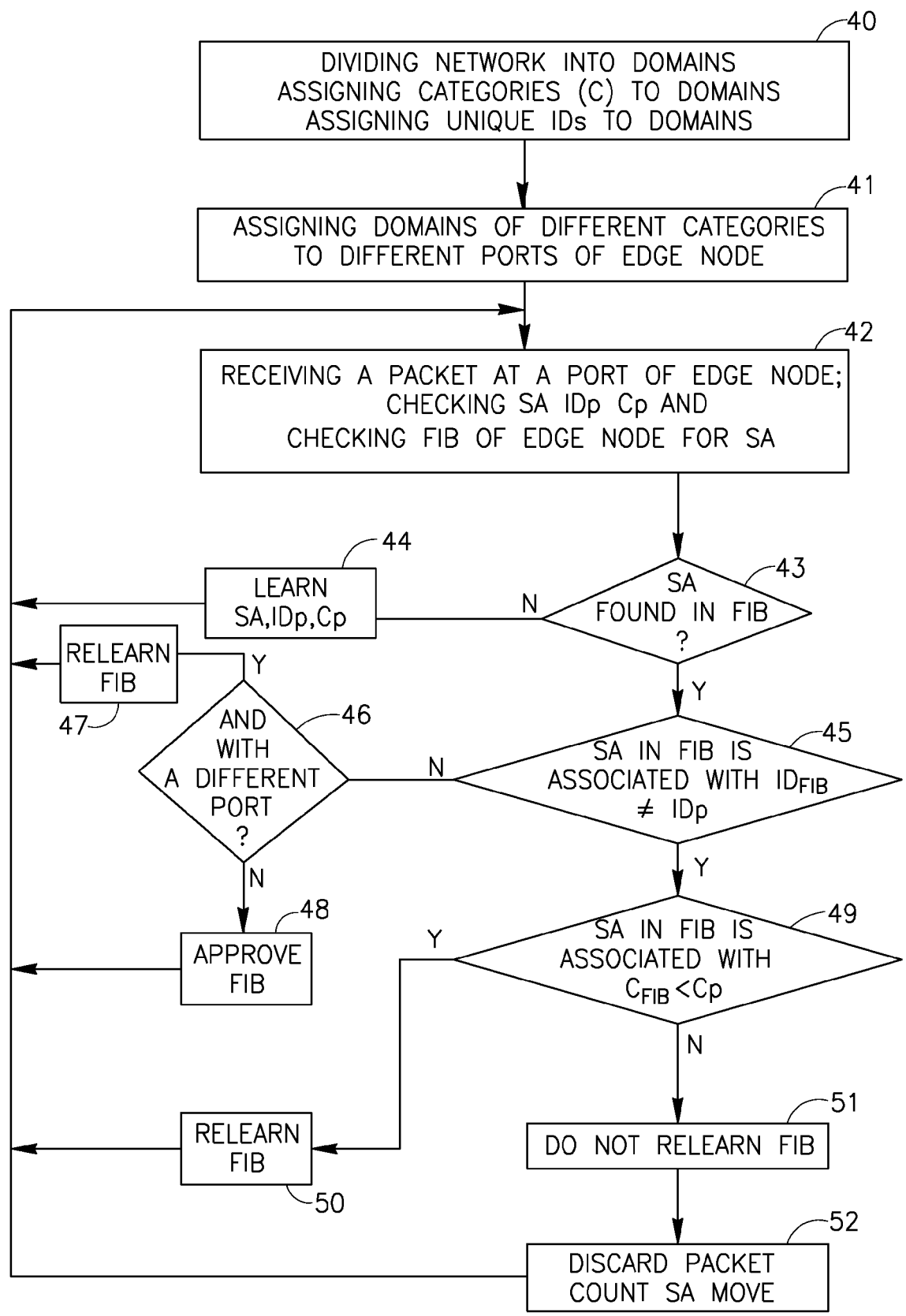
FIG. 3 is a schematic flow chart illustrating the proposed loop prevention method which can be utilized at nodes of the multi-domain network.

FIG. 3 illustrates an exemplary algorithm of performing the method proposed by the Inventors. Two blocks 40 and 41 present preliminary steps of the method, i.e., assignments (of categories to network domains, of IDs to network domains, of network domains to ports of edge nodes). The assignments should be performed either at the level a Network Management System by software means and then communicated to edge nodes which are configured accordingly, or at the level of an edge node (preferably by configuring hardware of the node), or in a combined manner.

Block 42 presents the beginning of the analysis taking place when a packet arrives to a specific port of an edge node. The method comprises checking parameters of the received packet: its source address SA, $ID_P$ which is ID of the domain from which the packet arrives, $C_P$ which is category of the domain from which the packet arrives. It goes without saying that the port at which the packet has been received is also kept in mind. The analysis further comprises checking whether FIB of the edge node comprises an entry for the detected SA (i.e., whether that edge node recently forwarded packets from the same source address SA). Almost all of the operations listed in block 42 are usual for analyzing packets at network edge nodes, except for the new operation of checking the category and ID of the domain.

If the SA of the packet is not found in FIB (no entry exists for that address)—particulars of the packet will be "learned" by introducing them into a new entry in the FIB (blocks 43, 44). Every new entry exists in FIB for a predetermined time T which is controlled by an aging timer. If not used/approved during the time T, the entry will be deleted from FIB.

If the SA (i.e., the suitable entry) is found in FIB (block 43), the method checks whether ID of the domain stored in the existing entry ($ID_{FIB}$) equals to the domain ID ($ID_P$) of the packet under analysis (block 45). If ID coincides (i.e., it is the same domain), but the port for which the entry was stored differs from the port to which the packet arrived (block 46), the method allows relearning the FIB since changing the port in the same domain is acceptable (block 47). If the port is the same (block 46), it means that the forwarding of packets goes according to the previously existing entry. So, since the FIB entry is in use, it is approved by refreshing the aging timer (block 48).

If ID of the previously registered domain ($ID_{FIB}$) and ID of the presently used domain ($ID_P$) do not coincide, the method compares categories of the domains (block 49). Relearning of the FIB (block 50) is allowed only when $C_P$ (category of the domain from which the packet has arrived) is higher than $C_{FIB}$ (category of the domain registered in the FIB entry associated with the same SA), since a trusted domain is believed to behave legally (i.e., to initiate only legal re-routings).

If $C_P$ is lower than $C_{FIB}$, or equal to $C_{FIB}$ (block 49), the method detects a problem which may be more or less serious. To prevent a chance of looping, the method prohibits relearn of the FIB entry since, according to the proposed method, that specific packet comprises an "illegal" re-forwarding request (block 51). The rejection to relearn the FIB is preferably accompanied by discarding the packet. As well, it is recommended to start counting attempts of such re-forwarding (i.e., so-called "SA move" or "MAC move") for further diagnosis of the problem and/or indication (block 52).

The procedure may then return to analyzing a next packet, whenever received at any port of the edge node (block 42).

In order to better understand, which loops and misconnections can be combated by the proposed algorithm, let us consider some non-limiting examples. A traffic loop can be caused by a satellite/radio connection such as 26 shown in FIG. 2. For example, any source with a source address SA in the access domain 16 usually transmits packets via node E4 to node E1 in order to forward them to a user in the access network 18. The route for the packets having the source address SA was first learned by FIB of edge E4, and then by FIB of the edge node E1 as an entry associated with SA and a core domain 12. Let the traffic has occasionally been deflected via a radio link 26 to any user in the access network 20 and has arrived to edge E1 via ports of domain 20. FIB of the edge node E1 will immediately detect that a packet having the source address SA has appeared at a different port not corresponding to the existing entry in FIB, and that the "re-forwarding" attempt is initiated by a network domain 20 having a category lower than the category of domain 12. Indeed, if a lower category domain (a non-trusted domain) tries to change the forwarding route which was previously established and registered in the FIB by a trusted domain ($C_{FIB} > C_P$)—it definitely indicates a traffic loop. It is therefore demonstrated that the algorithm, when rejecting to relearn the FIB (block 51) and discarding the packet (block 52), has prevented forwarding packets based on the loop 26, and thus prevented impact of that loop on the packets routing in the network.

However, prevention of re-forwarding the packets only when $C_{FIB} > C_P$ would focus the method on combating only one type of looping, while ruling away other problematic cases of various misconnections/misconfigurations.

Even if categories of the "conflicting" domains are the same, there is still a possibility of looping. For example, if a packet from an access domain 20 has arrived to E1, while the packet was expected from domain 18 (as previously stored in the FIB of the edge node E1), there might be a loop between access domains 18 and 20, possibly due to an illegal connection such as 24. Such a situation may occur if the user of terminal A, illegally or by mistake, establishes a backdoor connection with a terminal B of access domain 20, which causes the traffic received at A to return to E1 via access ports of the domain 20).

Examples of preventing misconnections where the "conflicting" domains are trusted domains can also be imagined. Suppose, the edge node E1 capable of implementing the proposed method, administratively divides the trusted domain 12 into two trusted sub-domains 13 and 15 since at least one of nodes E2 and E3-E4 is incapable to implement the method. If any misconnection (not shown) causes the traffic, which usually arrives to E1 from E2/sub-domain 13, to arrive to E1 from sub-domain 15, the edge node E1 will prevent re-learning of its FIB and will stop the problematic traffic.

Yet another example: when ports of the edge node E1 are erroneously short-switched (a shortcut 28), the algorithm will also reject relearning the previous FIB entry, the wrong re-forwarding will be precluded and the misconnection can further be diagnosed.

It should be appreciated that various configurations of the multi-domain network can be presented, various kinds of networks can be utilized, other modifications of the proposed algorithm can be suggested and various embodiments of the network nodes and edge nodes can be proposed. Though, any of these versions and modifications should be considered part of the invention whenever falling under scope of the claims which follow.

The invention claimed is:

1. A method for combating traffic loops in a multi-domain network comprising at least two network domains interconnected by one or more edge nodes, each of the nodes interconnecting different network domains and having a Forwarding Information Base FIB, the method comprising:
   assigning to each network domain of the multi-domain network one category selected from a list comprising at least two categories: a high and a low,
   configuring the edge nodes to recognize the categories of the network domains, and FIBs of the edge nodes to register the categories;
   receiving and analyzing a packet arriving to a particular edge node, and
   making decisions at the particular edge node whether to relearn a relevant entry, if already existing in the FIB, by utilizing the assigned categories.

2. The method according to claim 1, wherein the step of making decisions comprises:
   comparing a category $C_P$ of a network domain from which the packet is received, and a category $C_{FIB}$ associated with a relevant entry if already existing in the FIB, and preventing relearning of said entry if the category $C_P$ is lower than the category $C_{FIB}$.

3. The method according to claim 1, further comprising assigning to each network domain its unique ID;
   assigning said network domains to ports of said one or more edge nodes so that at least one said particular edge node comprises at least two ports respectively assigned to network domains of two different categories, for interconnecting network domains of two different categories;
   and wherein the step of making decisions further comprises
   receiving said packet at one of said at least two ports of the particular edge node,
   analyzing said packet by checking source address SA of the packet, and determining $ID_P$ and category $C_P$ of a network domain from which the packet arrives, and
   checking whether there is the relevant entry concerning said source address SA in the Forwarding Information Base FIB of the particular edge node and, if yes, what are $ID_{FIB}$ and $C_{FIB}$ of a network domain associated with said SA in said entry;
   preventing relearn of said entry in the FIB at least in case when the source address SA appears to be stored in the FIB in association with a network domain having a different ID and a category higher than that of the network domain from which the packet has arrived: ($ID_{FIB} \neq ID_P$) and ($C_{FIB} > C_P$).

4. The method according to claim 3, further preventing relearn of the FIB entry if ($ID_{FIB} \neq ID_P$) and ($C_{FIB} = C_P$).

5. The method according to claim 1, wherein the multi-domain network is an Ethernet network utilizing MAC addressing, administratively divided into domains and comprising at least one core network domain and a number of access network domains; the at least one core network domain has the high category being the trusted domain and the access networks have a low category being non-trusted domains in comparison with the core network domain.

6. A software product comprising computer implementable instructions and data storable on a non-transitory computer readable medium, adapted to be installed in a network node and/or in a Network Management System and, when being run, being capable of implementing the method according to claim 1.

7. A network node serving an edge node interconnecting different network domains in a multi-domain network, said edge node being adapted to combat traffic loops in the network and comprises Forwarding Information Base FIB and a control and processing unit CPU cooperating with the FIB;
   the CPU and the FIB being configurable to recognize and register assignment of network domains of the multi-domain network to categories (C) selected from a list comprising at least two categories: a high ("trusted") and a low ("non-trusted");
   the control and processing unit (CPU) being further designed for analyzing a packet arriving to a particular edge node, and for deciding, by utilizing said assignment, whether to relearn an existing relevant entry in the FIB upon receiving said packet.

8. The network node according to claim 7, wherein the CPU is operative to compare a category $C_P$ of a network domain from which the packet is received, and a category $C_{FIB}$ associated with said relevant entry in the FIB, and to prevent relearning of said entry if the category $C_P$ is lower than the category $C_{FIB}$.

9. The network node according to claim 7, wherein the control and processing unit CPU and FIB being further configurable to recognize and register assignment of unique identifiers ID to network domains of the multi-domain network;
the edge node being configurable to comprise at least two ports respectively assigned to network domains of different categories;
the CPU being designed for the following operations to analyze the packet arriving to one of said at least two ports of said edge node:
checking source address SA of the packet,
determining $ID_P$ and the category $C_P$ of a network domain from which the packet arrives,
checking whether the FIB of the node comprises the relevant entry for said source address SA and, if yes, what are $ID_{FIB}$ and the $C_{FIB}$ of a network domain associated with said SA in said entry,
the CPU being designed for preventing relearn of the entry in the FIB at least in case when: $(ID_{FIB} \neq ID_P)$, $(C_{FIB} > C_P)$.

10. The network node according to claim 9, further configurable to prevent relearn of the entry in the FIB also in cases when $(ID_{FIB} \neq ID_P)$ and $(C_{FIB} = C_P)$.

11. The network node according to claim 7, wherein the control and processing unit CPU is a hardware unit configurable by an operator.

12. A multi-domain network adapted to combat traffic loops, and comprising at least two network domains interconnected by one or more edge nodes according to claim 7.

* * * * *